US012619736B2

(12) United States Patent
Kacker et al.

(10) Patent No.: US 12,619,736 B2
(45) Date of Patent: May 5, 2026

(54) INTELLIGENT SOFTWARE COMPOSITION MANAGEMENT WITH PERFORMANCE AND SECURITY ALERTS

(71) Applicant: Dell Products L.P., Round Rock, TX (US)

(72) Inventors: Shamik Kacker, Austin, TX (US); Bijan Kumar Mohanty, Austin, TX (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 18/315,012

(22) Filed: May 10, 2023

(65) Prior Publication Data

US 2024/0378298 A1      Nov. 14, 2024

(51) Int. Cl.
G06F 21/55 (2013.01)
G06F 8/75 (2018.01)
G06F 21/57 (2013.01)

(52) U.S. Cl.
CPC .............. G06F 21/577 (2013.01); G06F 8/75 (2013.01); G06F 2221/033 (2013.01)

(58) Field of Classification Search
CPC ..... G06F 21/577; G06F 8/75; G06F 2221/033
USPC .......................................................... 726/25
See application file for complete search history.

(56) References Cited

U.S. PATENT DOCUMENTS

| | | | | |
|---|---|---|---|---|
| 11,495,215 | B1 * | 11/2022 | Wu ........................ | G10L 15/16 |
| 11,568,991 | B1 * | 1/2023 | Jain ....................... | G16H 40/63 |
| 12,423,807 | B2 * | 9/2025 | Schwab ............... | A61B 5/4088 |
| 2015/0128249 | A1 * | 5/2015 | Alexandrian ........... | G06F 21/62 |
| | | | | 726/16 |
| 2016/0110549 | A1 * | 4/2016 | Schmitt .................... | G06F 8/77 |
| | | | | 726/25 |
| 2017/0195458 | A1 * | 7/2017 | Parekh .................... | G06F 9/547 |
| 2017/0257303 | A1 * | 9/2017 | Boyapalle .............. | H04L 67/34 |
| 2018/0247642 | A1 * | 8/2018 | Kim ........................ | G10L 15/16 |
| 2019/0042922 | A1 * | 2/2019 | Pillai ...................... | G06F 7/556 |
| 2019/0042988 | A1 * | 2/2019 | Brown ............... | G06F 16/9535 |
| 2019/0221205 | A1 * | 7/2019 | Czyryba ................. | G10L 15/02 |
| 2019/0354913 | A1 * | 11/2019 | Venkadesavaralu ........................ | |
| | | | | G06Q 10/06393 |

(Continued)

OTHER PUBLICATIONS

U.S. Non-Final Office Action dated Dec. 14, 2023 for U.S. Appl. No. 17/505,399; 16 Pages.

(Continued)

*Primary Examiner* — Taghi T Arani
*Assistant Examiner* — Pegah Barzegar
(74) *Attorney, Agent, or Firm* — DALY, CROWLEY, MOFFORD & DURKEE, LLP

(57) ABSTRACT

An example methodology includes, by a computing device, receiving information regarding a new application from another computing device and determining one or more relevant features from the information regarding the new application, the one or more relevant features influencing predictions of any potential performance issue and any potential security issue. The method also includes, by the computing device, generating, using a multi-target machine learning (ML) model, a first prediction of any potential performance issue for the new application and a second prediction of any potential security issue for the new application based on the determined one or more relevant features, and sending the first and second predictions to the another computing device.

13 Claims, 8 Drawing Sheets

(56) References Cited

U.S. PATENT DOCUMENTS

| | | | | |
|---|---|---|---|---|
| 2020/0125736 | A1* | 4/2020 | Mcclintock | G06F 11/3604 |
| 2020/0125877 | A1* | 4/2020 | Phan | G06N 3/04 |
| 2021/0020038 | A1* | 1/2021 | Weldemariam | G08G 1/0133 |
| 2021/0073615 | A1* | 3/2021 | Niwa | G06N 3/084 |
| 2021/0264025 | A1* | 8/2021 | Givental | G06N 3/0464 |
| 2021/0303969 | A1* | 9/2021 | Amiri | G06N 3/0895 |
| 2022/0276326 | A1* | 9/2022 | Xing | G06N 3/09 |
| 2022/0276997 | A1* | 9/2022 | Li | G06N 7/01 |
| 2022/0284297 | A1* | 9/2022 | Giuseppe Trainiti | G06N 3/088 |
| 2022/0358100 | A1* | 11/2022 | Lucarelli | G06F 16/2282 |
| 2023/0042468 | A1* | 2/2023 | Wang | G10L 21/0224 |
| 2023/0056838 | A1* | 2/2023 | Schwab | A61B 5/0042 |
| 2023/0119396 | A1 | 4/2023 | Mohanty et al. | |
| 2023/0146292 | A1* | 5/2023 | Zhou | G06N 3/045 |
| | | | | 706/26 |
| 2023/0244866 | A1* | 8/2023 | Agrawal | G06N 3/045 |
| | | | | 715/811 |
| 2023/0252478 | A1* | 8/2023 | Saleh | G06Q 20/4016 |
| | | | | 705/44 |
| 2023/0291946 | A1* | 9/2023 | Chen | G06Q 30/0201 |
| 2024/0055012 | A1* | 2/2024 | Wang | G10L 25/30 |
| 2024/0157896 | A1* | 5/2024 | Gangumalla | B60W 10/30 |
| 2024/0184981 | A1* | 6/2024 | Murdock, IV | G06F 40/186 |
| 2024/0289645 | A1* | 8/2024 | Makhijani | G06N 5/01 |
| 2024/0311725 | A1* | 9/2024 | Zhang | G06Q 10/06316 |
| 2024/0330455 | A1* | 10/2024 | Sahu | G06F 21/577 |
| 2024/0378298 | A1* | 11/2024 | Kacker | G06F 21/577 |
| 2024/0426498 | A1* | 12/2024 | Shi | F24F 11/38 |
| 2025/0053661 | A1* | 2/2025 | Misra | G06F 8/71 |

OTHER PUBLICATIONS

Response to U.S. Non-Final Office Action dated Dec. 14, 2023 for U.S. Appl. No. 17/505,399; Response filed on Mar. 7, 2024; 11 Pages.

U.S. Final Office Action dated Mar. 28, 2024 for U.S. Appl. No. 17/505,399; 19 Pages.

RCE filed Jun. 27, 2024 for U.S. Appl. No. 17/505,399; 3 Pages.

Response to U.S. Non-Final Office Action dated Mar. 28, 2024 for U.S. Appl. No. 17/505,399; Response filed on Jun. 27, 2024; 11 Pages.

U.S. Office Action dated Sep. 11, 2024 for U.S. Appl. No. 17/505,399; 19 Pages.

U.S. Advisory Action dated Oct. 31, 2023 for U.S. Appl. No. 17/505,399; 4 Pages.

RCE filed Nov. 3, 2023 for U.S. Appl. No. 17/505,399; 3 Pages.

Response to U.S. Non-Final Office Action dated Sep. 11, 2024 for U.S. Appl. No. 17/505,399; Response filed on Dec. 11, 2024; 11 Pages.

U.S. Final Office Action dated Jan. 17, 2025 for U.S. Appl. No. 17/505,399; 21 Pages.

U.S. Office Action dated Jan. 20, 2023, for U.S. Appl. No. 17/505,399; 21 pages.

Response to U.S. Office Action dated Jan. 20, 2023, for U.S. Appl. No. 17/505,399; Response filed Apr. 6, 2023; 13 pages.

U.S. Final Office Action dated Aug. 21, 2023, for U.S. Appl. No. 17/505,399; 15 pages.

Response to Final U.S. Office Action dated Aug. 21, 2023, for U.S. Appl. No. 17/505,399; Response filed Oct. 18, 2023; 11 pages.

* cited by examiner

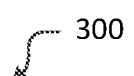
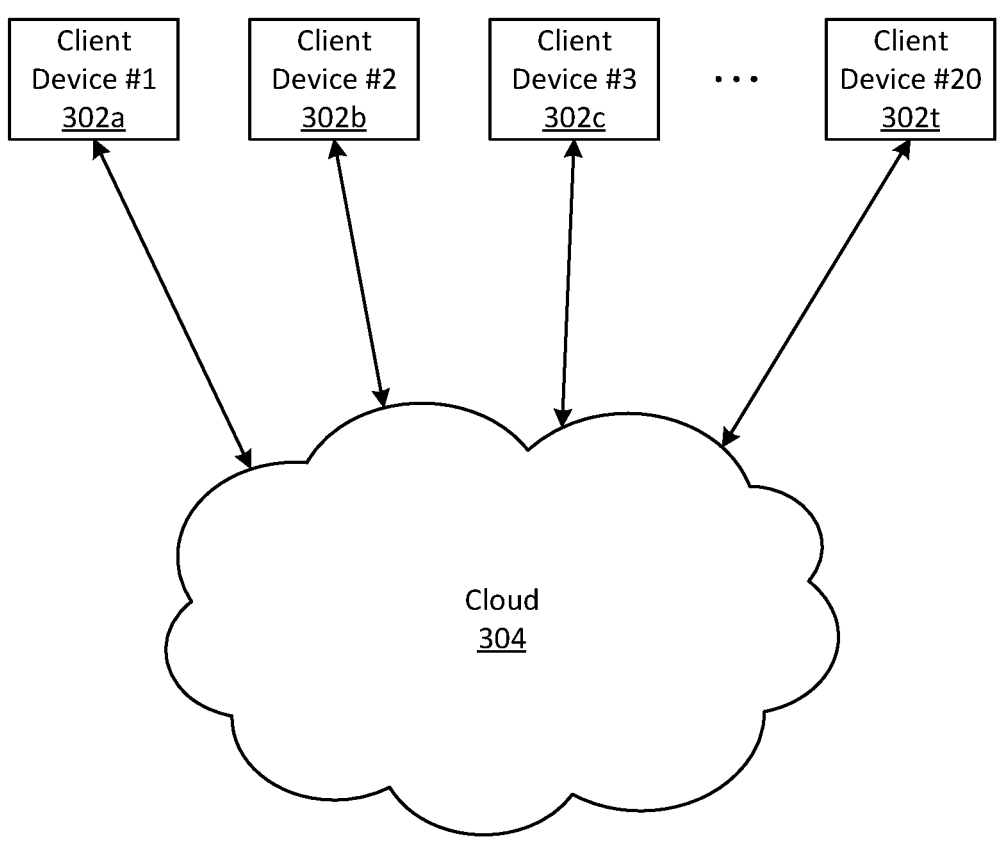
FIG. 3

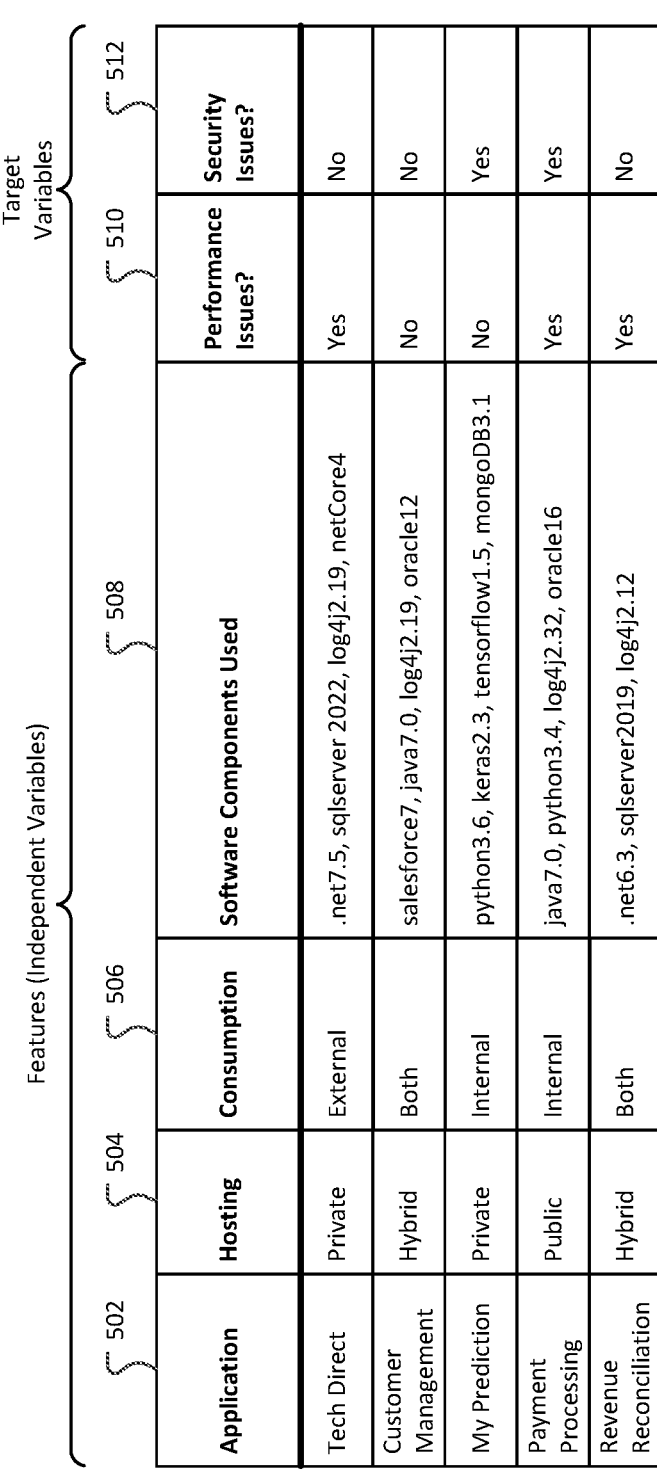

| Application | Hosting | Consumption | Software Components Used | Performance Issues? | Security Issues? |
|---|---|---|---|---|---|
| Tech Direct | Private | External | .net7.5, sqlserver 2022, log4j2.19, netCore4 | Yes | No |
| Customer Management | Hybrid | Both | salesforce7, java7.0, log4j2.19, oracle12 | No | No |
| My Prediction | Private | Internal | python3.6, keras2.3, tensorflow1.5, mongoDB3.1 | No | Yes |
| Payment Processing | Public | Internal | java7.0, python3.4, log4j2.32, oracle16 | Yes | Yes |
| Revenue Reconciliation | Hybrid | Both | .net6.3, sqlserver2019, log4j2.12 | Yes | No |

500

Features (Independent Variables)

Target Variables 502  504  506  508  510  512

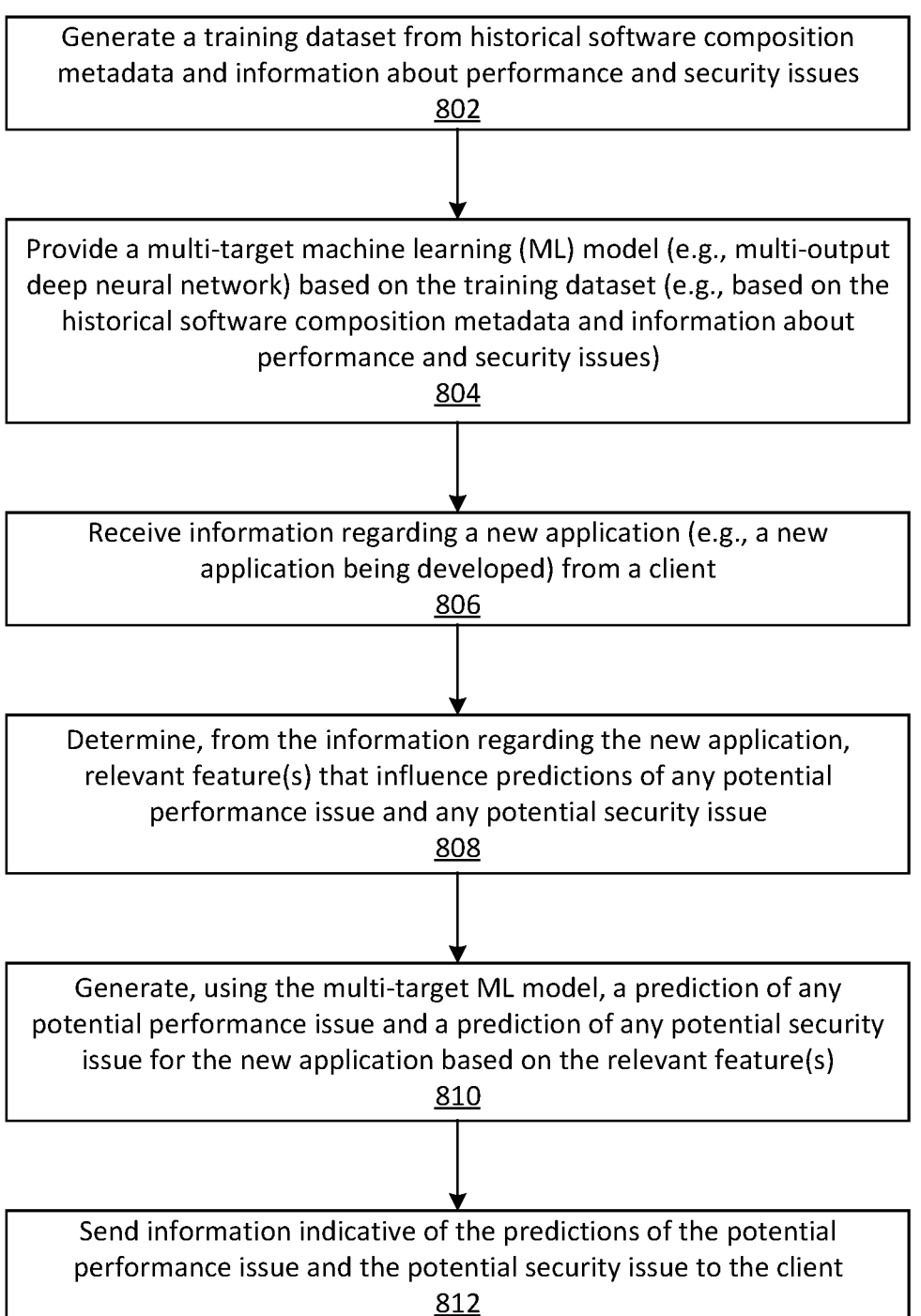

Generate a training dataset from historical software composition
metadata and information about performance and security issues
802

Provide a multi-target machine learning (ML) model (e.g., multi-output
deep neural network) based on the training dataset (e.g., based on the
historical software composition metadata and information about
performance and security issues)
804

Receive information regarding a new application (e.g., a new
application being developed) from a client
806

Determine, from the information regarding the new application,
relevant feature(s) that influence predictions of any potential
performance issue and any potential security issue
808

Generate, using the multi-target ML model, a prediction of any
potential performance issue and a prediction of any potential security
issue for the new application based on the relevant feature(s)
810

Send information indicative of the predictions of the potential
performance issue and the potential security issue to the client
812

FIG. 8

INTELLIGENT SOFTWARE COMPOSITION MANAGEMENT WITH PERFORMANCE AND SECURITY ALERTS

BACKGROUND

Organizations, such as software companies, typically create software using various combinations of custom code, commercial off-the-shelf software (COTS), and open-source software (OSS). The created software may be consumed internally and/or externally by customers. While OSS offers many benefits to organizations, these organizations are challenged with having to comply with the various licenses (e.g., open-source licenses) that govern the use of OSS, as failure to comply with these licenses can but the organization at significant risk of litigation as well as compromise the intellectual property (IP). For instance, the most recent annual Open-Source Security and Risk Analysis (OSSRA) report found that over 53% of the codebases audited contained open-source license conflicts, which typically involved the GNU General Public License (GPL). These conflicts can lead to serious implications with mergers and acquisitions, vendor disputes, and distribution problems for the organization.

Open-source vulnerabilities also pose significant risks to application security. Open-source vulnerabilities are security risks contained within or created by open-source components. The vulnerabilities are primarily due to the way OSS is developed, e.g., not being subject to the same level of scrutiny as software that is custom developed. These open-source vulnerabilities can potentially expose an organization to threats such as malware injections, data breaches, and Denial-of-Service (DOS) attacks.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, receiving information regarding a new application from another computing device and determining one or more relevant features from the information regarding the new application, the one or more relevant features influencing predictions of any potential performance issue and any potential security issue. The method also includes, by the computing device, generating, using a multi-target machine learning (ML) model, a first prediction of any potential performance issue for the new application and a second prediction of any potential security issue for the new application based on the determined one or more relevant features, and sending the first and second predictions to the another computing device.

In some embodiments, the multi-target ML model includes a multi-output deep neural network (DNN). In one aspect, the multi-output DNN predicts a first classification response and a second classification response, wherein the first classification response is the first prediction of any potential performance issue for the new application and the second classification response is the second prediction of any potential security issue for the new application.

In some embodiments, the multi-target ML model is generated using a training dataset generated from a corpus of historical software composition metadata and information about performance and security issues of an organization.

In some embodiments, the training dataset comprises a plurality of training/testing samples, wherein each training/testing sample of the plurality of training/testing samples includes one or more features extracted from the historical software composition metadata and information about performance and security issues, wherein the one or more features includes a feature indicative of a hosting associated with an application.

In some embodiments, the training dataset comprises a plurality of training/testing samples, wherein each training/testing sample of the plurality of training/testing samples includes one or more features extracted from the historical software composition metadata and information about performance and security issues wherein the one or more features includes a feature indicative of a consumption associated with an application.

In some embodiments, the training dataset comprises a plurality of training/testing samples, wherein each training/testing sample of the plurality of training/testing samples includes one or more features extracted from the historical software composition metadata and information about performance and security issues, wherein the one or more features includes a feature indicative of a software component used in an application. In one aspect, the software component includes a commercial off-the-shelf software (COTS) component. In one aspect, the software component includes an open-source software (OSS) component.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 3 is a diagram of a cloud computing environment in which various aspects of the concepts described herein may be implemented.

FIG. 5 is a diagram illustrating a portion of a data structure that can be used to store information about relevant features of a training dataset for training a multi-target machine learning (ML) model to predict any potential performance issue and predict any potential security issue for an application, in accordance with an embodiment of the present disclosure.

FIG. 8 is a flow diagram of an example process for predictions of potential performance issues and potential security issues for an application, in accordance with an embodiment of the present disclosure.

DETAILED DESCRIPTION

Figure 1:
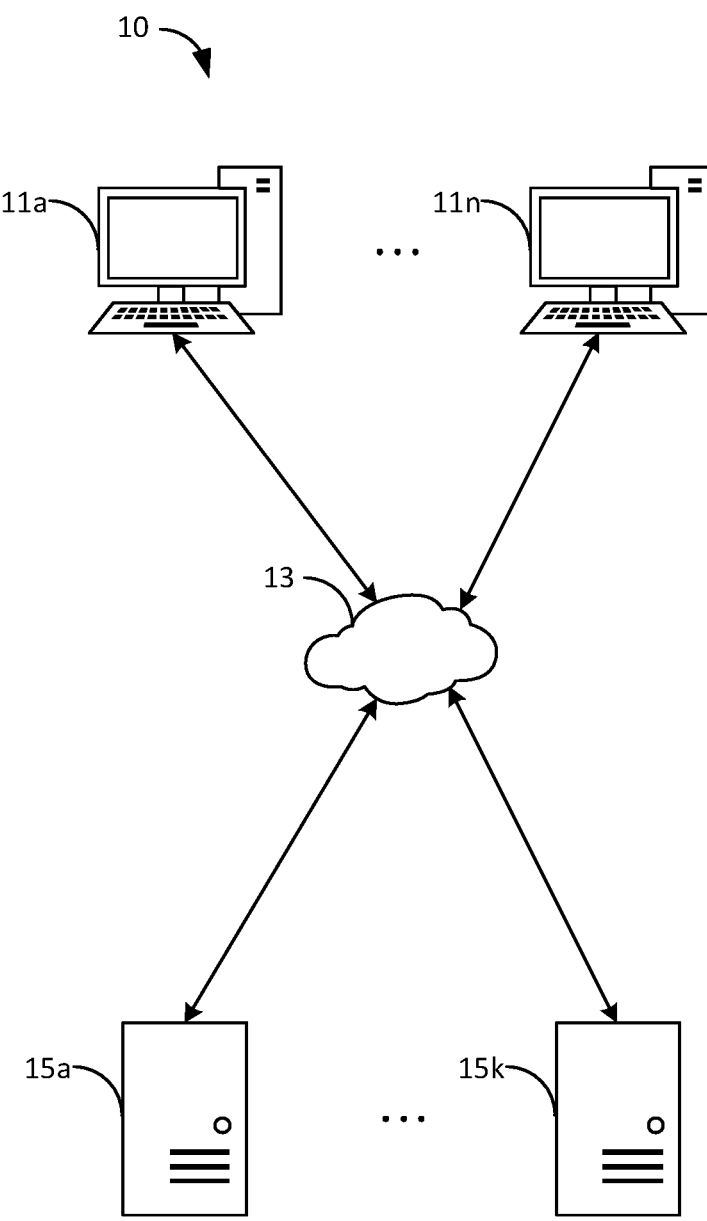
FIG. 1 is a diagram illustrating an example network environment of computing devices in which various aspects of the disclosure may be implemented, in accordance with an embodiment of the present disclosure.

Organizations need to keep track of open-source within their ecosystem due to the potential security and business risks associated with the use of open-source software (OSS). These security and business risks include compromised data security, reputational damage, financial loss, and operational disruptions. For instance, vulnerabilities in OSS are made public knowledge by contributors themselves, as well as by organizations such as the Open Web Application Security Project (OWASP) and the National Vulnerability Database (NVD). In addition, OSS comes with no claims or legal obligations for security and community support informing users how to implement OSS securely may be lacking. The developers responsible for creating OSS are often not security experts and may not understand how to implement best practices. Also, there are over 300 different licenses that can be applied to OSS, including Apache, GPL, and MIT. Many of these licenses are incompatible with each other, meaning that certain components cannot be used together since users have to comply with all terms when using OSS. Further, OSS does not come with any warranties as to its security, support, or content.

Development teams within an organization often have insufficient or non-existent review processes governing the use of OSS. As a result, it is not uncommon for multiple versions of the same OSS component to be used by different teams within the organization. Also, application developers might be unaware of conflicting functionality or licensing associated with the different versions of the OSS components. Customers of an organization are also requesting information regarding open-source products/tools/libraries used in the organization's product suites and services so that the customers can better manage their security and business risks.

Use of a software bill of materials (SBOM) is emerging as a vital building block in software security and risk management. A SBOM is a complete inventory of a codebase including the open-source components, the license and version information for those open-source components, and indications of any known vulnerabilities in those components. Existing software composition analysis tools, such as BLACK DUCK, can provide a SBOM of an application including open source. However, such tools are capable of only scanning applications for any open-source related security issues as managed by the tools. These tools lack the intelligence and capabilities to anticipate (i.e., predict) any potential security and vulnerability issues which may arise from the use of a hybrid software model (i.e., both commercial and open-source components).

Disclosed herein are computer-implemented structures and techniques for managing and governing software components and libraries for individual applications and predicting any potential performance issues and potential security issues due to the combination of the software components used in the applications. According to some embodiments, a multi-target machine learning (ML) model is leveraged to predict potential performance issues and predict potential security issues for applications (e.g., new applications). For example, a training dataset can be generated from information about the software composition, relationships, and dependencies of the organization's applications as well as information about any performance issues and security issues which were encountered during or over the life of the applications. The training dataset can be used to train a ML algorithm capable of prediction of multiple target variables (e.g., potential performance issues and potential security issues), such as a neural network-based multi-output classification algorithm, where the training can configure the multi-target ML model to learn trends in the training data. Once trained, the multi-target ML model can, in response to input of information about a new application, output two predictions simultaneously: one prediction of any potential performance issue for the new application and another prediction of any potential security issue for the new application. Such insights into any potential performance or security issues of new applications can enable the development of organization-wide comprehensive open-source policies which will help to dictate what sources and license types are acceptable for use and should help application developers within or associated with an organization decide whether to use individual components or an entire codebase in developing new applications.

The use of the multi-target ML model to output the two predictions simultaneously may provide benefits over using a combination of two separate single output ML models. For example, training two single output ML models may take longer and be more computationally expensive than training the multi-target ML model in accordance with implementations of this disclosure. As another example, training the multi-target ML model in accordance with implementations of this disclosure may optimize for the multiple targets (e.g., two targets) together which may improve the accuracy of the output predictions compared to optimizing for a single target as in the case of using single output ML models.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to as a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
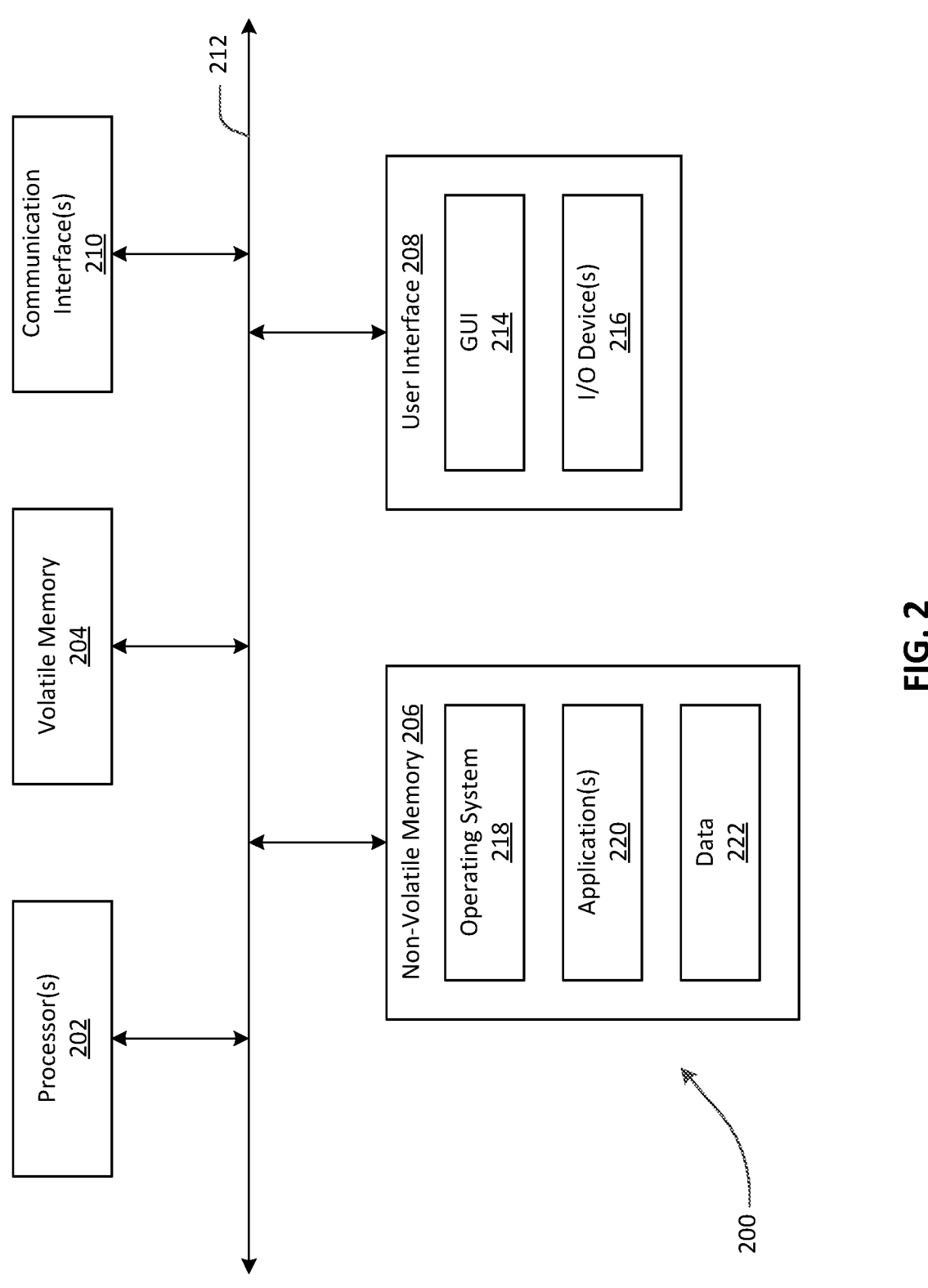
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 7). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital, or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (SaaS), Platform as a Service (PaaS), Infrastructure as a Service (IaaS), and/or Desktop as a Service (DaaS), for example. IaaS may refer to a user renting the use of infrastructure resources that are needed during a specified period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
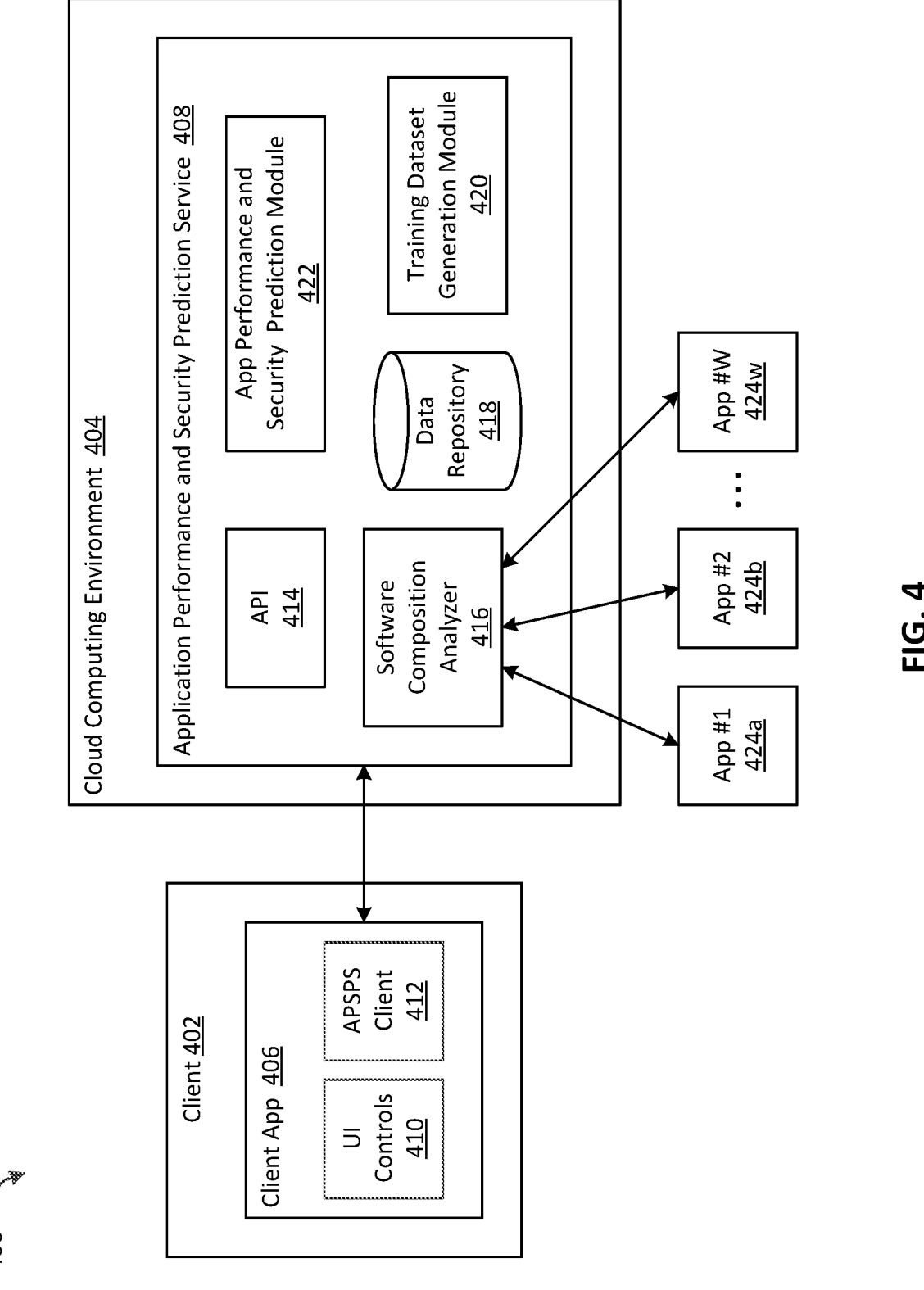
FIG. 4 is a block diagram of an illustrative system for intelligent software composition management with performance and security alerts, in accordance with an embodiment of the present disclosure.

FIG. 4 is a block diagram of an illustrative system 400 for intelligent software composition management with performance and security alerts, in accordance with an embodiment of the present disclosure. Illustrative system 400 includes a client application 406 operable to run on a client 402 and configured to communicate with a cloud computing environment 404 via one or more computer networks. Client 402 and cloud computing environment 404 of FIG. 4 can be the same as or similar to client 11 of FIG. 1 and cloud computing environment 300 of FIG. 3, respectively.

As shown in FIG. 4, an application performance and security prediction service 408 can be provided as a service (e.g., a microservice) within cloud computing environment 404. For example, an organization such as a company, an enterprise, or other entity that develops and/or develops applications (e.g., software applications, application software, etc.), for instance, may implement and use application performance and security prediction service 408 to predict potential performance issues and predict potential security issues for new applications. Client application 406 and application performance and security prediction service 408 can interoperate to provide intelligent predictions of potential performance issues and potential security issues for applications, as variously disclosed herein. To promote clarity in the drawings, FIG. 4 shows a single client application 406 communicably coupled to application performance and security prediction service 408. However, embodiments of application performance and security prediction service 408 can be used to service many client applications (e.g., client applications 406) running on client devices (e.g., clients 402) associated with one or more organizations and/or users. Client application 406 and/or application performance and security prediction service 408 may be implemented as computer instructions executable to perform the corresponding functions disclosed herein. Client application 406 and application performance and security prediction service 408 can be logically and/or physically organized into one or more components. In the example of FIG. 4, client application 406 includes UI controls 410 and an application performance and security prediction service (APSPS) client 412. Also, in this example, application performance and security prediction service 408 includes an application programming interface (API) module 414, a software component analyzer 416, a data repository 418, a training dataset generation module 420, and an application performance and security prediction module 422.

The client-side client application 406 can communicate with the cloud-side application performance and security prediction service 408 using an API. For example, client application 406 can utilize APSPS client 412 to send requests (or "messages") to application performance and security prediction service 408 wherein the requests are received and processed by API module 414 or one or more other components of application performance and security prediction service 408. Likewise, application performance and security prediction service 408 can utilize API module 414 to send responses/messages to client application 406 wherein the responses/messages are received and processed by APSPS client 412 or one or more other components of client application 406.

Client application 406 can include various UI controls 410 that enable a user (e.g., a user of client 402), such as an application developer or manager or other associate within or associated with an organization, to access and interact with application performance and security prediction service 408. For example, UI controls 410 can include UI elements/controls, such as input fields and text fields, with which the user can specify details about a new application for which prediction of potential performance issues and prediction of potential security issues is being requested. The specified new application may be, for example, being developed or being considered for use by the organization. In some implementations, UI controls 410 may include a text field which can be used to specify a SBOM of the new application. In some implementations, some or all the UI elements/controls can be included in or otherwise provided via one or more electronic forms configured to provide a series of fields where data is collected, for example. UI controls 410 can include UI elements/controls that a user can click/tap to request predictions of potential performance issues and potential security issues for the specified application. In response to the user's input, client application 406 can send a message to application performance and security prediction service 408 requesting predictions of any potential performance issue and any potential security issue for the specified application.

Client application 406 can also include UI controls 410 that enable a user to view predictions of any potential performance issue and any potential security issue. For example, in some embodiments, responsive to sending a request for predictions of any potential performance issue and any potential security issue for a new application, client application 406 may receive a response from application performance and security prediction service 408 which includes a prediction of any potential performance issue and a prediction of any potential security issue for the specified new application. UI controls 410 can include a button or other type of control/element for displaying the predictions included in the response from application performance and security prediction service 408, for example, on a display connected to or otherwise associated with client 402. The user can then take appropriate action based on the provided predictions. For example, the user can proactively address potential performance and/or security issues predicted for a new application (e.g., change the design of the application, change composition of the COTS components and libraries and OSS components and libraries utilized by the application, among other possible actions).

In the embodiment of FIG. 4, client application 406 is shown as a stand-alone client application. In other embodiments, client application 406 may be implemented as a plug-in or extension to another application (e.g., a web browser) on client 402, such as, for example, an enterprise client application. In such embodiments, UI controls 410 may be accessed within the other application in which client application 406 is implemented (e.g., accessed within the enterprise client application).

Referring to the cloud-side application performance and security prediction service 408, software component analyzer 416 is operable to derive software composition, relationships, and dependencies, including programming languages, databases, and other OSS and COTS components and libraries, of the organization's various applications. Such information about the various applications in the organization is sometimes referred to herein as "historical software composition metadata." The applications can include, for example, one or more applications 424a-424w (individually referred to herein as application 424 or collectively referred to herein as applications 424). Applications 120 can include various types of applications such as software as a service (SaaS) applications, web applications, and desktop applications. Non-limiting examples of applications 424 that may be used within the organization include word processing software, graphics software, spreadsheet software, presentation software, web browsers, multimedia software, customer relationship management (CRM) application software, enterprise resource planning (ERP) application software, project management (PM) application software, resource management (RM) application software, and database.

In some embodiments, for a particular application (e.g., application 424), software component analyzer 416 can analyze the application and its manifest file(s), which describe the name, version, and constituent files of the application, to determine the application's software composition, relationships, and dependencies, including programming languages, databases, OSS and COTS components and libraries, etc. (e.g., the historical software composition metadata for the application). Software component analyzer 416 can, according to one implementation, maintain the historical software composition metadata of the application in a SBOM. In some implementations, for a particular application, software component analyzer 416 can utilize a software composition analysis tool, such as BLACK DUCK, to derive a SBOM for the application. Such SBOM for an application may include information about the software composition, relationships, and dependencies, including programming languages, databases, OSS and COTS components and libraries, etc., of the application. In any case, software component analyzer 416 can store the SBOM for each application (e.g., the historical software composition metadata) within data repository 418, where it can subsequently be retrieved and used. For example, the historical software composition metadata and other materials from data repository 418 can be retrieved and used to generate a training dataset for use in generating an ML model (e.g., a multi-target ML model). In some embodiments, data repository 418 may correspond to a storage service within the computing environment of application performance and security prediction service 408.

In some embodiments, software component analyzer 416 is operable to derive information on the hosting and consumption of the organization's various applications. For example, software component analyzer 416 can collect or otherwise retrieve information about the hosting and consumption of the applications from the organization's product development system and other repositories and systems used by the organization to maintain such information. Software component analyzer 416 can store the information about the hosting and consumption of the applications with or as part of the historical software composition metadata within data repository 418, where it can be subsequently retrieved and used.

In some embodiments, software component analyzer 416 is operable to derive information about issues related to performance and security of the organization's various applications. For example, software component analyzer 416 can collect or otherwise retrieve information about the performance issues and the security issues that were encountered by the applications over their lifespan from the organization's product lifecycle management (PLM) system and other repositories and systems used by the organization to maintain such information. Examples of performance issues include network latency and bandwidth, CPU utilization, component compatibility/integration issues, and resource utilization, among others. Examples of security issues include incompatible licenses and vulnerabilities such as threats, ransomware, etc. in the software, among others. In some embodiments, software component analyzer 416 can collect (or "scrape") and analyze posts and other content shared by users of the applications (e.g., user generated content) form various data sources to derive information about issues related to performance and security of the organization's various applications. Software component analyzer 416 can store the information about the performance and security issues encountered by the applications within data repository 418, where it can be subsequently retrieved and used.

Training dataset generation module 420 is operable to generate (or "create") a training dataset for use in generating (e.g., training, testing, etc.) a ML model (e.g., a multi-target ML model) to predict any potential performance issue and predict any potential security issue for an application. Training dataset generation module 420 can retrieve from data repository 418 a corpus of historical software composition metadata and information about performance and security issues from which to generate the training dataset. The amount of historical software composition metadata and information about performance and security issues to retrieve and use to generate the training dataset may be configured as part of the organization's policy or a user preference.

To generate a training dataset, training dataset generation module 420 may preprocess the retrieved corpus of historical software composition metadata and information about performance and security issues to be in a form that is suitable for training and testing the ML model (e.g., a multi-target ML model). In one embodiment, training dataset generation module 420 may utilize natural language processing (NLP) algorithms and techniques to preprocess the retrieved historical software composition metadata and information about performance and security issues. For example, the data preprocessing may include tokenization (e.g., splitting a phrase, sentence, paragraph, or an entire text document into smaller units, such as individual words or terms), noise removal (e.g., removing whitespaces, characters, digits, and items of text which can interfere with the extraction of features from the data), stop words removal, stemming, and/or lemmatization.

The data preprocessing may also include placing the data into a tabular format. In the table, the structured columns represent the features (also called "variables"), and each row represents an observation or instance (e.g., an application in the organization). Thus, each column in the table shows a different feature of the instance. The data preprocessing may also include placing the data (information) in the table into a format that is suitable for training a model (e.g., placing into a format that is suitable for a DNN or other suitable learning algorithm to learn from to generate (or "build") the ML model, e.g., a multi-target ML model). For example, since machine learning deals with numerical values, textual categorical values (i.e., free text) in the columns can be converted (i.e., encoded) into numerical values. According to one embodiment, the textual categorical values may be encoded using label encoding. According to alternative embodiments, the textual categorical values may be encoded using one-hot encoding or other suitable encoding methods.

The data preprocessing may also include null data handling (e.g., the handling of missing values in the table). For example, an application may not use all the software components and libraries utilized within or by the organization. In these cases, the software composition metadata can include missing values. According to one embodiment, null or missing values in a column (a feature) may be replaced by median of the other values in that column. For example, median imputation may be performed using a median imputation technique such as that provided by Scikit-learn (Sk-learn). According to alternative embodiments, observations in the table with null or missing values in a column may be replaced by a mode or mean value of the values in that column or removed from the table.

The data preprocessing may also include feature selection and/or data engineering to determine or identify the relevant or important features from the noisy data (e.g., the unnecessary features and the features that are highly correlated). The relevant/important features are the features that are more correlated with the thing being predicted by the trained model (e.g., potential performance issue and potential security issue). A variety of feature engineering techniques, such as exploratory data analysis (EDA) and/or bivariate data analysis with multivariate-variate plots and/or correlation heatmaps and diagrams, among others, may be used to determine the relevant features. For example, for a particular application, the relevant features may include important features from the software composition, relationships, and dependencies metadata such as the various software components and libraries (e.g., the various COTS components and libraries and the various OSS components and libraries), the versions of the various software components and libraries, development data, consumption data (e.g., external to the organization, internal to the organization, both external to the organization and internal to the organization), and hosting data (e.g., public cloud, private cloud, hybrid cloud, etc.), among others.

The data preprocessing can include adding an informative label to each instance in the training dataset. As explained above, each instance in the training dataset represents an application in the organization (e.g., an application utilized by the organization). In some implementations, one or more labels (e.g., an indication of performance issues (e.g., application encountered a performance issue or did not encounter a performance issue during or over the life of the application) and an indication of security issues (e.g., application encountered a security issue or did not encounter a security issue during or over the life of the application)) can be added to each instance in the training dataset. The label added to each instance, i.e., the label added to each application, is a representation of a prediction for that instance in the training dataset (e.g., the things being predicted) and helps a machine learning model learn to make the prediction when encountered in data without a label. For example, for a given application, a first label may indicate whether the application encountered a performance issue and a second label may indicate whether the application encountered a security issue.

Each instance in the table may represent a training/testing sample (i.e., an instance of a training/testing sample) in the training dataset and each column may be a relevant feature of the training/testing sample. As previously described, each training/testing sample may correspond to an application in the organization. In a training/testing sample, the relevant features are the independent variables and the things being predicted (e.g., potential performance issue and potential security issue) are the dependent variables (e.g., labels). In some embodiments, the individual training/testing samples may be used to generate a feature vector, which is a multi-dimensional vector of elements or components that represent the features in a training/testing sample. In such embodiments, the generated feature vectors may be used for training or testing a multi-target ML model using supervised learning to make the predictions. Examples of relevant features of a training dataset for training/testing the multi-target ML model for predicting a potential performance issue and predicting a potential security issue for an application are provided below with respect to FIG. 5.

In some embodiments, training dataset generation module 420 may reduce the number of features in the training dataset. For example, since the training dataset is being generated from the corpus of historical software composition metadata and information about performance and security issues, the number of features (or input variables) in the dataset may be very large. The large number of input features can result in poor performance for machine learning algorithms. For example, in one embodiment, training dataset generation module 420 can utilize dimensionality reduction techniques, such as principal component analysis (PCA), to reduce the dimension of the training dataset (e.g., reduce the number of features in the dataset), hence improving the model's accuracy and performance.

In some embodiments, training dataset generation module 420 can generate the training dataset on a continuous or periodic basis (e.g., according to a predetermined schedule specified by the organization). Additionally or alternatively, training dataset generation module 420 can generate the training dataset in response to an input. For example, a user of application performance and security prediction service 408 can use their client 402 and issue a request to generate a training dataset. In response, training dataset generation module 420 can retrieve the historical software composition metadata and information about performance and security issues for generating the training dataset from data repository 418 and generate the training dataset using the retrieved historical software composition metadata and information about performance and security issues. Training dataset generation module 420 can store the generated training dataset within data repository 418, where it can subsequently be retrieved and used (e.g., retrieved and used to build a multi-target ML model for predicting potential performance issues and predicting potential security issues for an application).

Still referring to application performance and security prediction service 408, application performance and security prediction module 422 is operable to predict any potential performance issue and predict any potential security issue for applications. In other words, application performance and security prediction module 422 is operable to, for an input of information about a new application (e.g., a new application that is being developed), predict any potential performance issue and predict any potential security issue for the new application. In some embodiments, application performance and security prediction module 422 can include an ML algorithm that supports outputting multiple predictions, such as a DNN, trained to simultaneously output two classification responses using a training dataset generated from the organization's historical software composition metadata and information about performance and security issues. The training dataset may be retrieved from data repository 418. Once the multi-target ML model is trained, one output classification response can be a prediction of any potential performance issue and another output classification response can be a prediction of any potential security issue. For example, in response to input of information about a new application, the multi-target ML model can predict any potential performance issue and predict any potential security issue for the input new application based on the learned behaviors (or "trends") in the training dataset. Further description of the training of the ML algorithm that supports outputting multiple predictions (e.g., a DNN) and which can be implemented within application performance and security prediction module 422 is provided below at least with respect to FIG. 6.

In other embodiments, application performance and security prediction module 422 can implement two separate single output ML models instead of the multi-target ML model described above. For example, application performance and security prediction module 422 can include two ML classification models both generated from the organization's historical software composition metadata and information about performance and security issues. The first trained ML classification model can, in response to input of information about a new application (e.g., a new application that is being developed), predict any potential performance issue for the input new application. The second trained ML classification model can, in response to input of the information about the new application, predict any potential security issue for the input new application.

Referring now to FIG. 5 and with continued reference to FIG. 4, shown is a diagram illustrating a portion of a data structure 500 that can be used to store information about relevant features of a training dataset for training a multi-target machine learning (ML) model to predict any potential performance issue and predict any potential security issue for an application, in accordance with an embodiment of the present disclosure. For example, the training dataset including the illustrated features, as well as other features generated from historical software composition metadata and information about performance and security issues, may be used to train a multi-output DNN to predict potential performance and potential security issues for an application. As can be seen in FIG. 5, data structure 500 may be in a tabular format in which the structured columns represent the different relevant features (variables) regarding the applications in the organization and a row represents individual applications. The relevant features illustrated in data structure 500 are merely examples of features that may be extracted from software composition metadata of the applications and used to generate a training dataset and should not be construed to limit the embodiments described herein.

As shown in FIG. 5, the relevant features may include an application 502, a hosting 504, a consumption 506, a software components used 508, a performance issues 510, and a security issues 512. Application 502 indicates a name or identifier assigned to an application (e.g., a name of the application). Hosting 504 indicates the type of platform or infrastructure associated with the application (e.g., indicates how the application is hosted). As can be seen in data structure 500, examples of type of hosting include private (e.g., the application is deployed/hosted on a private cloud exclusive to the organization), public (e.g., the application is deployed/hosted on a public cloud), and hybrid (e.g., the application is deployed/hosted on a combination of a private cloud and a public cloud). Consumption 506 indicates the type of consumption (i.e., type of use) associated with the application. As can be seen in data structure 500, examples of type of consumption include external (e.g., consumption to be external to the organization), internal (e.g., consumption to be internal to the organization), and both (e.g., consumption to be both external to the organization and internal to the organization). Software components used 508 indicates the software components and/or libraries used or included in the application. In some implementations, the software components and/or libraries used/included in an application may be determined from the SBOM of the application. The individual software components and/or libraries used/included in an application may each be a feature of the application. In other words, the individual software components and/or libraries can be different features extracted from the software component, relationships, and dependencies metadata of an application. For instance, in the example of FIG. 5, the application "Tech Direct" represented by the training/testing sample in the first row of data structure 500 uses the software components and/or libraries.net7.5, sqlserver 2022, log 4j2.19, and netCore4, as indicated by software components used 508 of the training/testing sample. In this example, the .net7.5, sqlserver 2022, log 4j2.19, and netCore4 may each be a feature of the application "Tech Direct" (e.g., .net7.5, sqlserver 2022, log 4j2.19, and netCore4 may each be a feature extracted from of the software component metadata of application "Tech Direct"). As another example, as shown by the fourth record in data structure 500, the application "Payment Processing" uses the software components and/or libraries java7.0, python3.4, log 4j2.32, and oracle16, as indicated by software components used 508 of the training/testing sample. In this example, the java7.0, python3.4, log 4j2.32, and oracle16 may each be a feature of the application "Payment Processing" (e.g., java7.0, python3.4, log 4j2.32, and oracle16 may each be a feature extracted from of the software component metadata of application "Payment Processing").

Performance issues 510 indicates whether any performance issues were encountered during or over the life of the application (e.g., "Yes"=performance issue encountered; "No"=performance issue not encountered). Security issues 510 indicates whether any security issues were encountered during or over the life of the application (e.g., "Yes"=security issue encountered; "No"=security issue not encountered).

In data structure 500, each row may represent a training/testing sample (i.e., an instance of a training/testing sample) in the training dataset, and each column may show a different relevant feature of the training/testing sample. In some embodiments, the individual training/testing samples may be used to generate a feature vector, which is a multi-dimensional vector of elements or components that represent the features in a training/testing sample. In such embodiments, the generated feature vectors may be used for training/testing a multi-target ML model (e.g., a multi-output classifier-based model of application performance and security prediction module 422) to predict any potential performance issue and predict any potential security issue for a new application (e.g., a new application that is being developed). The features application 502, hosting 504, consumption 506, and software components used 508 may be included in a training/testing sample as the independent variables, and performance issues 510 and security issues 512 included as two dependent variables (target variables) in the training/testing sample. That is, performance issues 510 and security issues 512 are the labels added to the individual training/testing samples. The illustrated independent variables are features that influence performance of the multi-target ML model (i.e., features that are relevant (or influential) in predicting potential performance issues and predicting potential security issues for an application).

Figure 6:
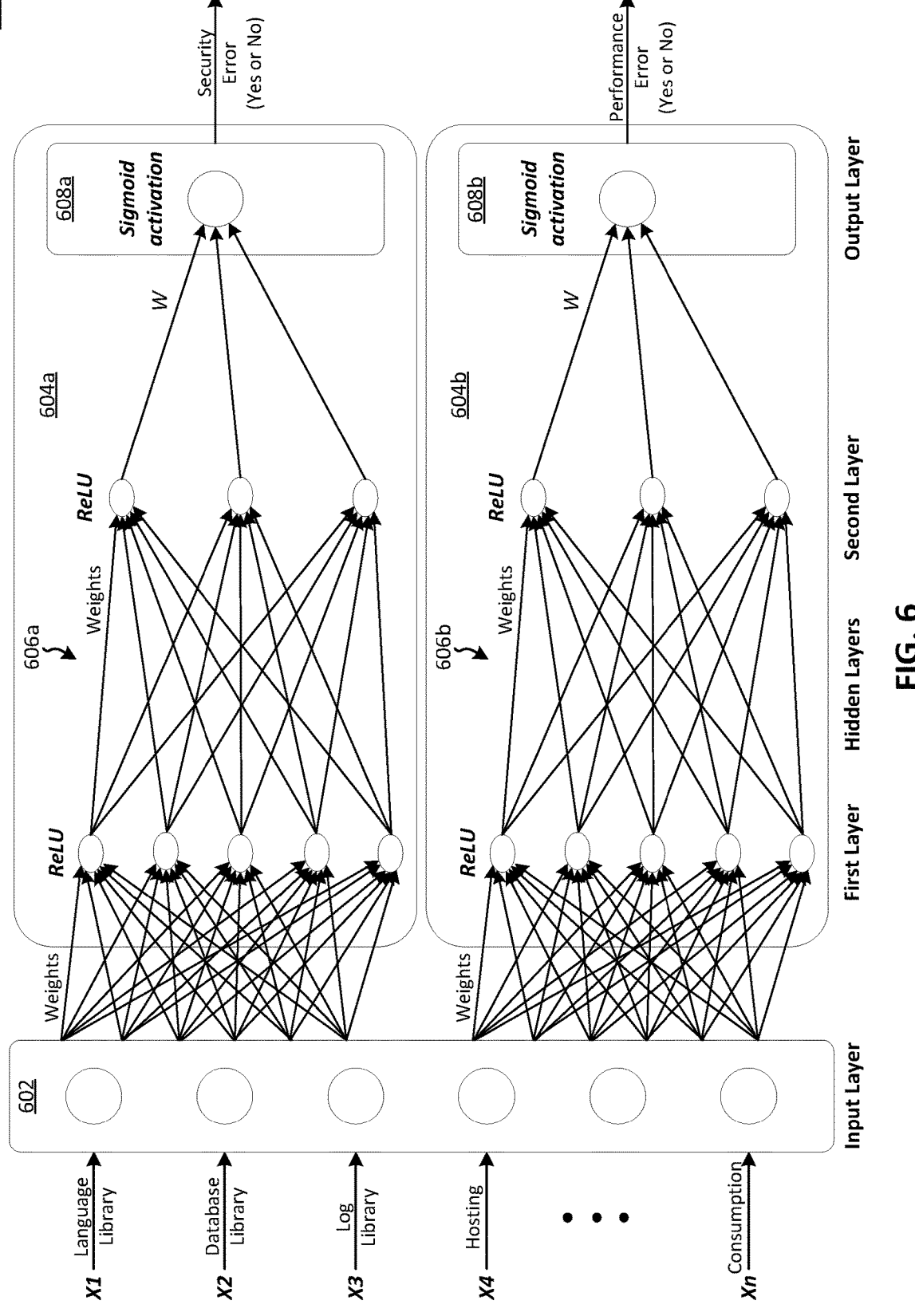
FIG. 6 is a diagram illustrating an example architecture of a multi-output deep neural network (DNN) for an application performance and security prediction module, in accordance with an embodiment of the present disclosure.

Referring now to FIG. 6 and with continued reference to FIGS. 4 and 5, illustrated is an example architecture of a multi-output deep neural network (DNN) for an application performance and security prediction module 422 of FIG. 4, in accordance with an embodiment of the present disclosure. In brief, a DNN includes an input layer for all input variables, multiple hidden layers for feature extraction, and an output layer. Each layer may be composed of a number of nodes or units embodying an artificial neuron (or more simply a "neuron"). Each neuron in a layer receives an input from all the neurons in the preceding layer. In other words, every neuron in each layer is connected to every neuron in the preceding layer and the succeeding layer. As a multi-output DNN, a first output can be a first classification response (e.g., a prediction of potential performance issues) and a second output can be a second classification response (e.g., a prediction of potential security issues).

In more detail, and as shown in FIG. 6, a multi-output DNN 600 includes an input layer 602 and two network branches 604a, 604b. Network branch 604a includes one or more hidden layers 606a (e.g., two hidden layers) and an output layer 608a. Network branch 604b includes one or more hidden layers 606b (e.g., two hidden layers) and an output layer 608b. As illustrated in FIG. 6, network branches 604a, 604b may be parallel branches within multi-output DNN 600. In some embodiments, network branch 604a can be trained as a binary classification model that outputs a classification response (e.g., a prediction of potential performance issues) and network branch 604b can also be trained as a binary classification model that outputs a classification response (e.g., a prediction of potential security issues).

With respect to network branch 604*a*, hidden layers 606*a* include two hidden layers, a first hidden layer and a second hidden layer. Each hidden layer in hidden layers 606*a* can comprise an arbitrary number of neurons, which may depend on the number of neurons included in input layer 602. For example, input layer 602 may be composed of a number of neurons to match (i.e., equal to) the number of input variables (independent variables) in the individual training/testing samples, where each neuron in input layer 602 receives a respective independent variable. Taking as an example the independent variables illustrated in data structure 500 of FIG. 5, input layer 602 may include a plurality of neurons to match the plurality of independent variables (e.g., application 502, hosting 504, consumption 506, and the different custom, COTS, and OSS components and/or libraries of software components used 508). In the example of FIG. 6, the independent variables input to respective neurons in input layer 602 can include a language library (e.g., programming language), a database library, a log library, a hosting (e.g., hosting 504), and a consumption (e.g., consumption 506). Each neuron in the first hidden layer of hidden layers 606*a* receives an input from all the neurons in input layer 602. Each neuron in the second hidden layer of hidden layers 606*a* receives an input from all the neurons in the first hidden layer of hidden layers 606*b*. As a binary classification model, output layer 608*a* includes a single neuron, which receives an input from all the neurons in the second hidden layer of hidden layers 606*a*.

Each neuron in hidden layers 606*a* and the neuron in output layer 608*a* may be associated with an activation function. For example, according to one embodiment, the activation function for the neurons in hidden layers 606*a* may be a rectified linear unit (ReLU) activation function. As network branch 604*a* is to function as a binary classification model, the activation function for the neuron in output layer 608*a* may be a sigmoid activation function. Since this is a dense neural network, as can be seen in FIG. 6, each neuron in input layer 602 and the different layers of network branch 604*a* may be coupled to one another. Each coupling (i.e., each interconnection) between two neurons may be associated with a weight, which may be learned during a learning or training phase. Each neuron may also be associated with a bias factor, which may also be learned during a training process. Since network branch 604*a* is to be used as a binary classifier, binary cross entropy may be used as the loss function, adaptive movement estimation (Adam) as the optimization algorithm, and "accuracy" as the validation metric. In other embodiments, unpublished optimization algorithm designed for neural networks (RMSprop) may be used as the optimization algorithm.

With respect to network branch 604*b*, hidden layers 606*b* include two hidden layers, a first hidden layer and a second hidden layer. Each hidden layer in hidden layers 606*b* can comprise an arbitrary number of neurons, which may depend on the number of neurons included in input layer 602. Each neuron in the first hidden layer of hidden layers 606*b* receives an input from all the neurons in input layer 602. Each neuron in the second hidden layer of hidden layers 606*b* receives an input from all the neurons in the first hidden layer of hidden layers 606*b*. As a binary classification model, output layer 608*b* includes a single neuron, which receives an input from all the neurons in the second hidden layer of hidden layers 606*b*.

Each neuron in hidden layers 606*b* may be associated with an activation function. For example, according to one embodiment, the activation function for the neurons in hidden layers 606*b* may be a rectified linear unit (ReLU)

activation function. As network branch 604*b* is also to function as a binary classification model, the activation function for the neuron in output layer 608*b* may be a sigmoid activation function. Since this is a dense neural network, as can be seen in FIG. 6, each neuron in input layer 602 and the different layers of network branch 604*b* may be coupled to one another. Each coupling (i.e., each interconnection) between two neurons may be associated with a weight, which may be learned during a learning or training phase. Each neuron may also be associated with a bias factor, which may also be learned during a training process. Since network branch 604*b* is to be used as a binary classifier, binary cross entropy may be used as the loss function, adaptive movement estimation (Adam) as the optimization algorithm, and "accuracy" as the validation metric. In other embodiments, unpublished optimization algorithm designed for neural networks (RMSprop) may be used as the optimization algorithm.

Although FIG. 6 shows hidden layers 606*a*, 606*b* each composed of only two layers, it will be understood that hidden layers 606*a*, 606*b* may be composed of a different number of hidden layers. Also, the number of neurons shown in the first layer and in the second layer of each hidden layer 606*a*, 606*b* is for illustration only, and it will be understood that actual numbers of neurons in the first layer and in the second layer of each hidden layer 606*a*, 606*b* may be based on the number of neurons in input layer 602.

DNN 600 can be trained by passing the portion of the training dataset designated for training (e.g., 70% of the training dataset designated as the training dataset) and specifying a number of epochs. Note that, since DNN 600 is a multi-output DNN (i.e., generates multi-target predictions), the two target variables (i.e., the two classes performance issues 510 and security issues 512) are separated from the training dataset. An epoch (one pass of the entire training dataset) is completed once all the observations of the training data are passed through DNN 600. DNN 600 can be validated once DNN 600 completes the specified number of epochs. For example, DNN 600 can process the training dataset and the loss/error value can be calculated and used to assess the performance of DNN 600. The loss value indicates how well DNN 600 is trained. Note that a higher loss value means DNN 600 is not sufficiently trained. In this case, hyperparameter tuning may be performed. Hyperparameter tuning may include, for example, changing the loss function, changing optimizer algorithm, and/or changing the neural network architecture by adding more hidden layers of or to either or both network branches 604*a*, 604*b* of DNN 600. Additionally or alternatively, the number of epochs can be also increased to further train DNN 600. In any case, once the loss is reduced to a very small number (ideally close to 0), DNN 600 is sufficiently trained for prediction of the two classes. Prediction using the model (e.g., DNN 600) can be achieved by passing the independent variables of testing samples in the testing dataset (i.e., for comparing train vs. test) or the real values of an application (e.g., a new software application) to predict any potential performance issue and predict any potential security issue for the application.

In some embodiments, the ML model of application performance and security prediction module 422 (e.g., multi-output DNN 600) can be retrained and/or retested with an updated training dataset. For example, the training dataset or portions of the training dataset can be updated to include training data based on new or recent applications or training data that have otherwise not been previously used to train and/or test the ML model. Retraining in this manner updates the multi-output ML model with new and/or updated training data and enables the ML model to generate the most accurate predictions with the new and/or updated training data. For example, a security issue caused by a licensing incompatibility which existed in the training data that was used to train/test the ML model may be resolved since the ML model was last trained. As another example, a performance issue caused by an incompatibility between software components (e.g., incompatibility between a COTS component and an OSS component) which existed in the training data that was used to train/test the ML model may be resolved since the ML model was last trained. As still another example, a vulnerability in a software component which existed in the training data that was used to train/test the ML model may be resolved since the ML model was last trained. Conversely, a new vulnerability in a software component may be discovered/identified since the ML model was last trained. In any case, the training data or dataset can be updated to incorporate new training samples or training samples that have been relabeled (e.g., relabeled to no longer indicate a resolved performance issue and/or security issue).

Figure 7:
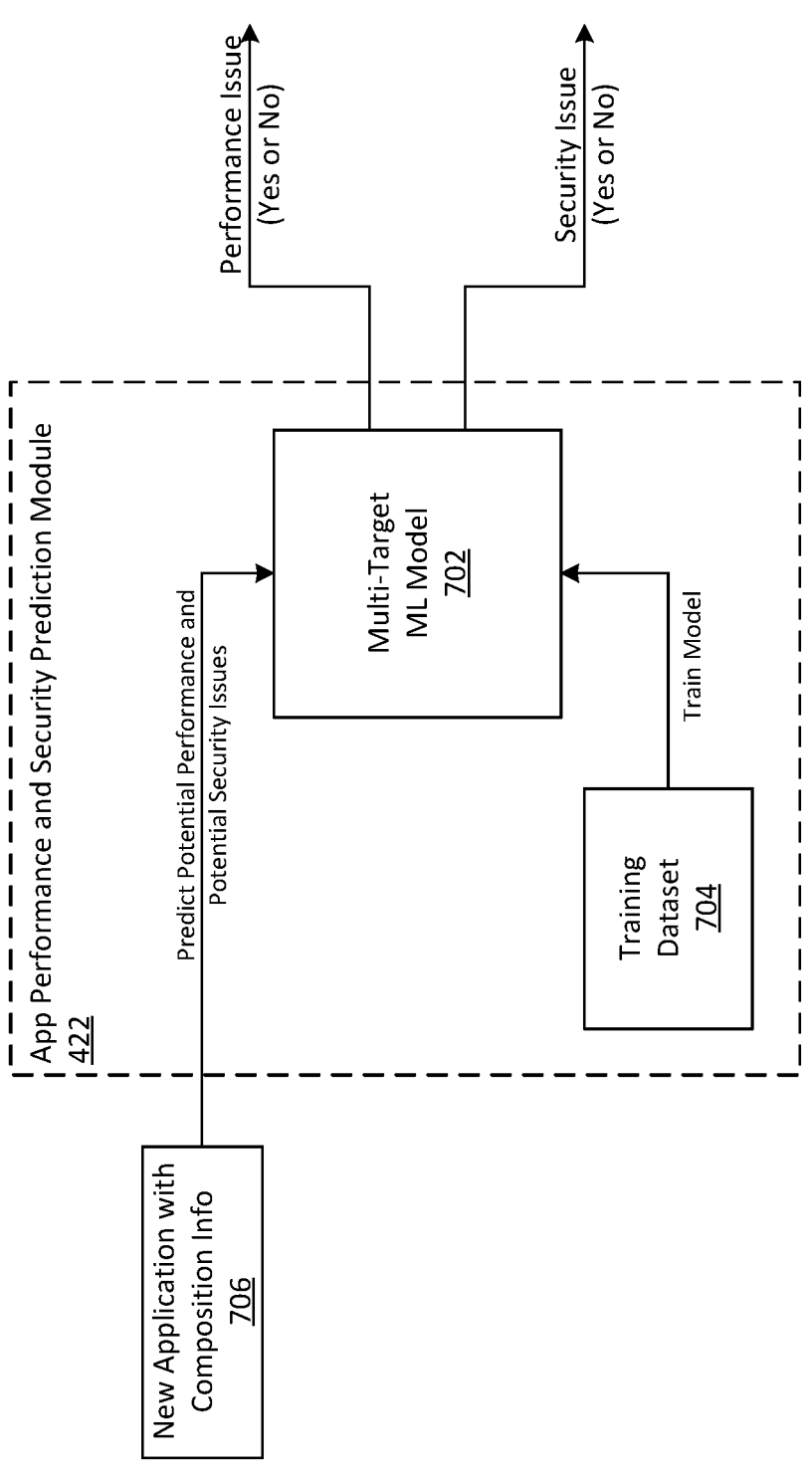
FIG. 7 is a diagram showing an example topology that can be used to predict any potential performance issue and predict any potential security issue for an application, in accordance with an embodiment of the present disclosure.

Referring now to FIG. 7, in which like elements of FIG. 4 are shown using like reference designators, shown is a diagram of an example topology that can be used to predict any potential performance issue and predict any potential security issue for an application, in accordance with an embodiment of the present disclosure. As shown in FIG. 7, application performance and security prediction module 422 includes a multi-target ML model 702. In some embodiments, multi-target ML model 702 may correspond to multi-output DNN 600 of FIG. 6. Multi-target ML model 702 can be trained and tested using machine learning techniques with a training dataset 704. Training dataset 704 can be retrieved from a data repository (e.g., data repository 418 of FIG. 4). As described previously, training dataset 704 for multi-target ML model 702 may be generated from a corpus of historical software composition metadata and information about performance and security issues. Once multi-target ML model 702 is sufficiently trained, application performance and security prediction module 422 can, in response to receiving information regarding a new application (e.g., a new application that is being developed), predict any potential performance issue and predict any potential security issue for the new application (e.g., predict whether the new application will encounter a performance issue and predict whether the new application will encounter a security issue). For example, as shown in FIG. 7, a feature vector 706 that represents a new application, such as some or all the variables that may influence the predictions of a potential performance issue and a potential security issue, may be determined and input, passed, or otherwise provided to the trained multi-target ML model 702. In some embodiments, the input feature vector 706 (e.g., the feature vector representing the new application) may include some or all the relevant features which were used in training multi-target ML model 702. In response to the input, the trained multi-target ML model 702 can output two responses: a first classification response which is a prediction of any potential performance issue for the new application (e.g., "Yes"=potential performance issue or "No"=no potential performance issue) and a second classification response which is a prediction of any potential security issue for the new application (e.g., "Yes"=potential security issue or "No"=no potential security issue).

FIG. 8 is a flow diagram of an example process 800 for predictions of potential performance issues and potential security issues for an application, in accordance with an embodiment of the present disclosure. Illustrative process 800 may be implemented, for example, within system 400 of FIG. 4. In more detail, process 800 may be performed, for example, in whole or in part by software composition analyzer 416, training dataset generation module 420, and application performance and security prediction module 422, or any combination of these including other components of system 400 described with respect to FIG. 4.

With reference to process 800 of FIG. 8, at 802, a training dataset for use in training a multi-target ML model may be generated from historical software composition metadata and information about performance and security issues of an organization. For example, software composition analyzer 416 may derive the historical software composition metadata and information about performance and security issues from various repositories and systems used by the organization to store or maintain such data/information and store the historical software composition metadata and information about performance and security issues within data repository 418. Training dataset generation module 420 can then retrieve a corpus of the historical software composition metadata and information about performance and security issues from data repository 418, generate the training dataset, as previously described herein, and store the training dataset within data repository 418.

At 804, a multi-target ML model trained or configured using the training dataset generated from some or all the historical software composition metadata and information about performance and security issues may be provided. For example, an ML algorithm that supports outputting multiple predictions may be trained and tested using the training dataset (e.g., training dataset generated by training dataset generation module 420) to build the multi-target ML model. For example, in one implementation, application performance and security prediction module 422 may retrieve the training dataset from data repository 418 and use the training dataset to train a multi-output DNN, as previously described herein. The trained multi-output DNN can, in response to receiving information regarding a new application (e.g., a new application that is being developed), output a first classification response (e.g., a prediction of any potential performance issue) and a second classification response (e.g., a prediction of any potential security issue).

At 806, information regarding a new application may be received. For example, the information regarding the new application may be received along with a request for predictions of any potential performance issue and any potential security issue for the new application from a client (e.g., client 402 of FIG. 4). For example, the request may be made during the development of the new application. In response to the information regarding the new application being received, at 808, relevant feature(s) that influence predictions of any potential performance issue and any potential security issue may be determined from the received information regarding the new application. For example, in one implementation, application performance and security prediction module 422 may determine the relevant feature(s) that influence predictions of any potential performance issue and any potential security issue, as previously described herein.

At 810, a prediction of any potential performance issue and a prediction of any potential security issue for the application may be generated. For example, application performance and security prediction module 422 may generate a feature vector that represents the relevant feature(s) of the new application specified in the request. Application performance and security prediction module 422 can then input the generated feature vector to the multi-target ML model (e.g., multi-output DNN), which outputs a first prediction of any potential performance issue for the new application and a second prediction of any potential security issue for the input application. The predictions generated using the multi-target ML model are based on the relevant feature(s) input to the multi-target ML model. The predictions by the multi-target ML model are based on the learned behaviors (or "trends") in the training dataset used in training the multi-target ML model.

At 812, information indicative of the predictions of any potential performance issue and any potential security issue for the new application specified in the request may be sent or otherwise provided to the client and presented to a user (e.g., the user who sent the request for predictions of any potential performance issue and any potential security issue for the new application). For example, the information indicative of the predictions may be presented within a user interface of a client application on the client. The user can then take one or more appropriate actions based on the provided predictions (e.g., proactively address potential performance and/or security issues predicted for the new application).

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   receiving, by a computing device, information regarding a new application from another computing device;
   determining, by the computing device, one or more relevant features from the information regarding the new application, the one or more relevant features influencing predictions of any potential performance issue and any potential security issue;

simultaneously generating, by the computing device using a multi-target machine learning (ML) model that has been trained using a training dataset generated from historical software composition metadata and information about performance and security issues, wherein the training dataset comprises a plurality of training/testing samples, and wherein each training/testing sample of the plurality of training/testing samples includes one or more features extracted from the historical software composition metadata and information about performance and security issues, further wherein the one or more features includes a feature indicative of an open-source software (OSS) component used in an application:

a first prediction, generated by a first parallel branch of the ML model, of any potential runtime performance issue for the new application based on the determined one or more relevant features; and a second prediction, generated by a second parallel branch of the ML model, of any potential security vulnerability issue for the new application based on the determined one or more relevant features; and sending, by the computing device, the first and second predictions to the another computing device.

2. The method of claim 1, wherein the multi-target ML model includes a multi-output deep neural network (DNN).

3. The method of claim 2, wherein the multi-output DNN predicts a first binary classification response and a second binary classification response, wherein the first binary classification response is the first prediction of any potential performance issue for the new application and the second binary classification response is the second prediction of any potential security issue for the new application.

4. The method of claim 1, wherein the one or more features includes a feature indicative of a hosting associated with an application.

5. The method of claim 1, wherein the one or more features includes a feature indicative of a consumption associated with an application.

6. The method of claim 1, wherein the software component includes a commercial off-the-shelf software (COTS) component.

7. A system comprising:

one or more non-transitory machine-readable mediums configured to store instructions; and one or more processors configured to execute the instructions stored on the one or more non-transitory machine-readable mediums, wherein execution of the instructions causes the one or more processors to carry out a process comprising:

receiving information regarding a new application from a computing device;

determining one or more relevant features from the information regarding the new application, the one or more relevant features influencing predictions of any potential performance issue and any potential security issue;

simultaneously generating, using a multi-target machine learning (ML) model that has been trained using a training dataset generated from historical software composition metadata and information about performance and security issues, wherein the training dataset comprises a plurality of training/testing samples, and wherein each training/testing sample of the plurality of training/testing samples includes one or more features extracted from the historical software composition metadata and information about performance and security issues, further wherein the one or more features includes a feature indicative of an open-source software (OSS) component used in an application:

a first prediction, generated by a first parallel branch of the ML model, of any potential runtime performance issue for the new application based on the determined one or more relevant features; and a second prediction, generated by a second parallel branch of the ML model, of any potential security vulnerability issue for the new application based on the determined one or more relevant features; and sending the first and second predictions to the computing device.

8. The system of claim 7, wherein the multi-target ML model includes a multi-output deep neural network (DNN).

9. The system of claim 8, wherein the multi-output DNN predicts a first binary classification response and a second binary classification response, wherein the first binary classification response is the first prediction of any potential performance issue for the new application and the second binary classification response is the second prediction of any potential security issue for the new application.

10. The system of claim 7, wherein the one or more features includes a feature indicative of one of a hosting associated with an application or a consumption associated with the application.

11. The system of claim 7, wherein the software component includes a commercial off-the-shelf software (COTS) component.

12. A non-transitory machine-readable medium encoding instructions that when executed by one or more processors cause a process to be carried out, the process including:

receiving information regarding a new application from a computing device;

determining one or more relevant features from the information regarding the new application, the one or more relevant features influencing predictions of any potential performance issue and any potential security issue;

simultaneously generating, using a multi-target machine learning (ML) model that has been trained using a training dataset generated from historical software composition metadata and information about performance and security issues, wherein the training dataset comprises a plurality of training/testing samples, and wherein each training/testing sample of the plurality of training/testing samples includes one or more features extracted from the historical software composition metadata and information about performance and security issues, further wherein the one or more features includes a feature indicative of an open-source software (OSS) component used in an application:

a first prediction, generated by a first parallel branch of the ML model, of any potential runtime performance issue for the new application based on the determined one or more relevant features; and a second prediction, generated by a second parallel branch of the ML model, of any potential security vulnerability issue for the new application based on the determined one or more relevant features; and sending the first and second predictions to the computing device.

13. The machine-readable medium of claim 12, wherein the multi-target ML model includes a multi-output deep neural network (DNN), wherein the multi-output DNN predicts a first binary classification response and a second binary classification response, wherein the first binary classification response is the first prediction of any potential performance issue for the new application and the second binary classification response is the second prediction of any potential security issue for the new application.

* * * * *